March 14, 1967 L. W. JACOBS ETAL 3,309,580

CIRCUIT BREAKER LOAD CENTER

Filed Dec. 24, 1964 3 Sheets-Sheet 1

INVENTORS
LEWIS W. JACOBS,
ROBERT J. SABATELLA
BY Robert P. Casey
ATTORNEY

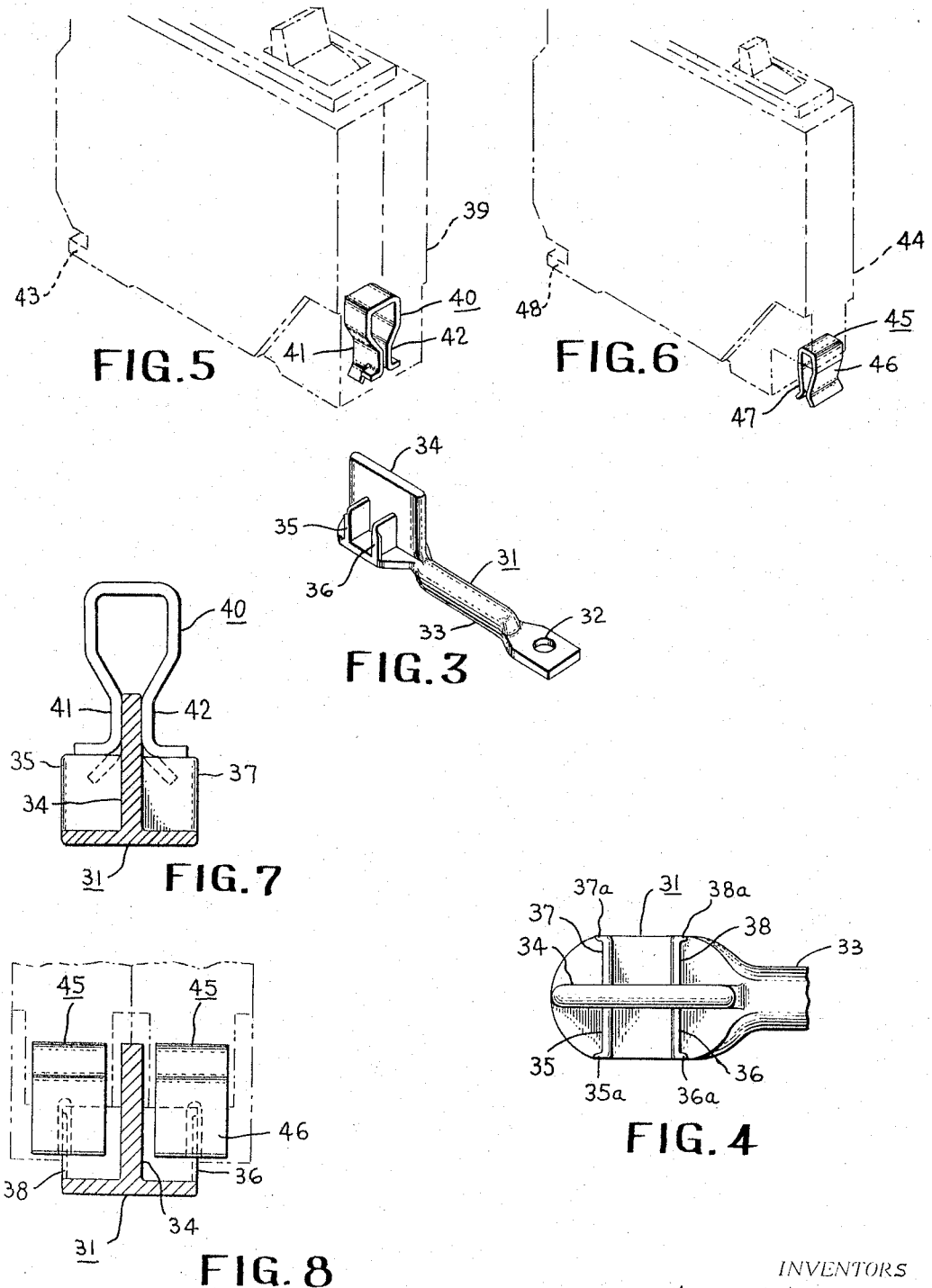

March 14, 1967 L. W. JACOBS ET AL 3,309,580
CIRCUIT BREAKER LOAD CENTER
Filed Dec. 24, 1964 3 Sheets-Sheet 3

INVENTORS
*Lewis W. Jacobs,*
*Robert J. Sabatella*
BY *Robert T. Casey*
ATTORNEY

United States Patent Office 3,309,580
Patented Mar. 14, 1967

3,309,580
CIRCUIT BREAKER LOAD CENTER
Lewis W. Jacobs, West Hartford, and Robert J. Sabatella, Southington, Conn., assignors to General Electric Company, a corporation of New York
Filed Dec. 24, 1964, Ser. No. 420,868
10 Claims. (Cl. 317—119)

This invention relates to circuit breaker panel boards and especially to such panel boards and load centers which include circuit breakers or functionally analogous devices having at least one terminal connected to a plug-in type electrical connection.

In electrical panel assemblies of the type referred to, control devices such as electric circuit breakers or fuse blocks may be readily inserted and removed by engaging a portion of the circuit breaker with a portion of the panel and rotating the circuit breaker about its point of engagement into plug-in type electrical engagement with a stationary contact carried by the panel.

Though such an arrangement affords highly desirable ease and convenience for the insertion and/or removal of such control devices in electrical engagement with such panels, there is a possibility that improper circuit breakers may be inadvertently connected into a circuit unless means are provided to effectively prevent such improper connection in the panel board. Circuit breakers are usually commercially manufactured in a board variety of amperage ratings and customarily have an exterior enclosure which comprises a generally rectangular insulating casing. Such insulating casings are usually made in several modular sizes, and each modular size will accommodate circuit breakers of a commensurate range of ampere ratings. For instance, the basic modular size of a small circuit breaker for use in residential installations and the like, may have a nominally one-inch wide case. Smaller modular circuit breakers may be nominally one-half inch wide. Similarly, larger modular circuit breakers may be nominally two inches wide. Accordingly, circuit breakers and functionally analogous devices may be segregated in accordance with modular size by providing that predetermined portions of panel board load centers will only accommodate circuit breakers of a desired modular size or sizes.

It is an object of the present invention to provide an electric control panel assembly including a load center which affords the predetermined segregation of circuit breakers according to their modular size as may be desired.

It is a further object of the present invention to provide an arrangement which will prevent the inadvertent insertion of a circuit breaker of the wrong modular size in any such segregated portion of the panel board load center.

It is also an object of the present invention to provide means by which several sizes of modular circuit breakers may be alternatively inserted as desired in connection with the load center of a panel board.

Yet a further object of the present invention is to provide coacting arrangement of panel board contacts and circuit breakers by which the foregoing objectives may be achieved and at the same time providing fully adequate electrical contact and good mechanical support for the circuit breakers when inserted into connection with the load center.

In accordance with one form of the invention, there is provided a base having insulating means mounted upon it and a plurality of electrical contacts supported on the insulating means. The electrical contacts have a particular form with a contact arm portion electrically connected adjacent one end thereof to said busbar and extending generally normally thereto and a base portion adjacent its other or free end with a transverse plane extending in spaced relationship to the base or support of the panel board and generally parallel thereto. The contact arm base portion also has at least one generally planar wing portion projecting upwardly therefrom and extending normally to the transverse plane and generally parallel to the busbars. The opposite surfaces of the wing portion provide a pair of contact surfaces extending generally parallel to the busbars and generally normally to the transverse plane. In accordance with the preferred embodiment, the contact unit also includes a central blade portion extending upwardly from the contact arm base portion intermediate the width thereof and extending generally normally to the busbars and to the contact arm base portion to provide a pair of contact surfaces which extend normally to said busbars and said panel board base. Generally, the preferred contact member will take the form of a central blade member extending outwardly from and normal to the plane of the base and having transverse blades or wings joined with and extending outwardly perpendicularly from the central blade on each of its sides. The contacts also have a base portion or web extending about and between the wings or transverse blades at the base thereof. Circuit breakers of two different modular sizes may be inserted in electrical connection with these generally H-shaped blade electrical contacts. In accordance with the concept of the present invention, circuit breakers of the larger modular size, which may be one-inch wide, for instance, include electrical contact means sockets preferably in the form of opposed resilient jaws which are positioned in one end of the circuit breaker adjacent one corner of the bottom wall of its insulating casing so as to be engageable with the central blade of the above-described contact member. In such a circuit breaker the opposed resilient jaws of the contact means are aligned centrally and generally along the axis of the major dimension of the bottom wall of the circuit breaker's insulating casing. Circuit breakers of smaller modular size, such as for instance, one-half inch width are similarly provided with electrical contact means positioned near one corner of the bottom wall of the insulating casing of the circuit breaker. However, the electrical contacts of the smaller size breakers which may take the form of opposed resilient jaws are positioned generally perpendicular to the major axis of the bottom wall of the insulating casing of the circuit breaker so as to be engageable with one of the transverse blades of the generally H-shaped blade contact means provided on the panel board load center as previously described. Further, the present invention conceives that two or more of the transverse blades may be excluded from the panel board contact means so that effectively only the larger modular size circuit breaker is engageable with that portion of the panel board contact means.

In accordance with another aspect of the present invention, adjacent electrical contacts of a panel board may be connected to different sources of electrical energy. Typically in such an arrangement adjacent electrical contacts may be arranged to supply two different phases of electrical energy so that the transverse blades of such adjacent contacts are disposed to be engageable by two circuit breaker units of the smaller modular size joined in an assembly by appropriate means including a common handle tie to provide a two-pole circuit breaker assembly.

In a similar manner the present invention is so conceived as to provide three adjacent contacts which are adaptable to connect with three different phases of an electrical source. A circuit breaker of the larger modular size and two circuit breakers of the smaller modular size may be joined by appropriate means including a common handle tie to be engageable with central blade contact and two transverse blade members of the adjacent electrical contacts on either side as a three pole circuit breaker assembly.

The invention will be more fully understood from the following detailed description and its scope will be pointed out in the appended claims.

In the drawings:

FIGURE 3 is a perspective view of one form of contact blade configured in accordance with the concept of the present invention;

FIGURE 4 is an enlarged view of the blade portion of a contact member of the type illustrated in FIGURES 1, 2 and 3;

FIGURE 5 is a partially phantom, perspective view of the larger size modular circuit breaker having contact means as conceived by the present invention;

FIGURE 6 is a partially phantom, perspective view of the smaller size modular circuit breaker having contact means as conceived by the present invention;

FIGURE 7 is an enlarged diagrammatic view of the manner in which the large modular size circuit breaker contact means engages the panel board contacts;

FIGURE 8 is an enlarged view of the manner in which two of the smaller size modular circuit breakers constructed in accordance with the concept of the present invention engage with the panel board blade contact means;

Figure 1:
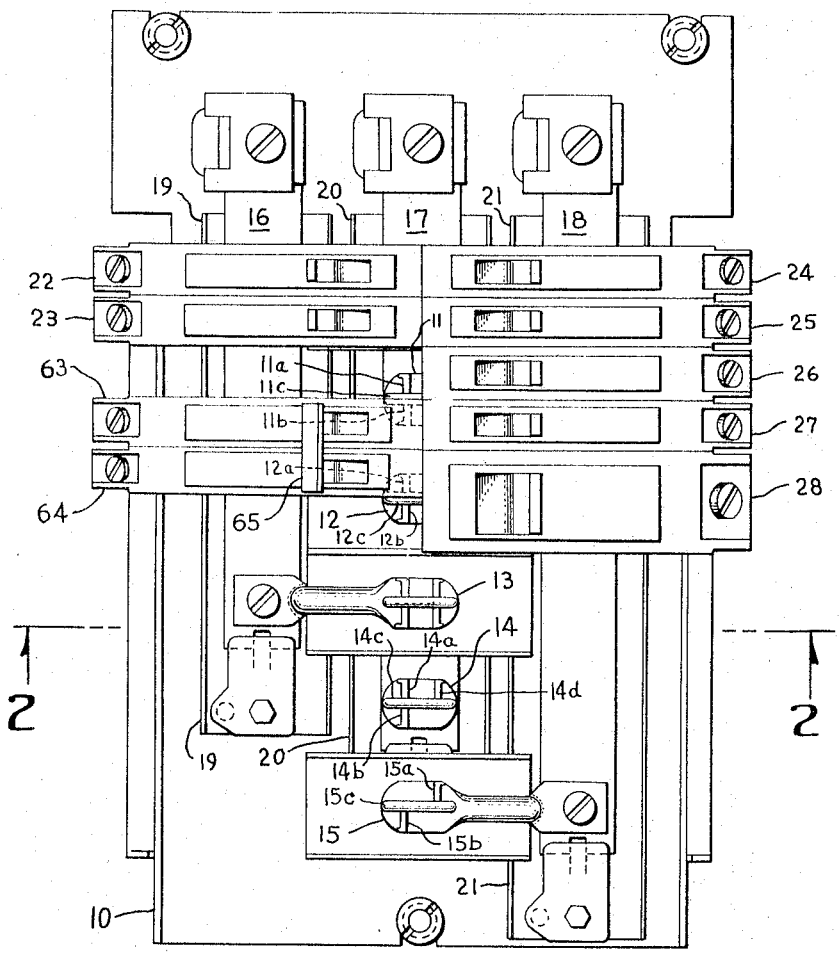
FIGURE 1 is a plan view of an electric circuit control device panel board embodying the present invention.

Referring now to FIGURE 1, it may be seen that an electric control panel assembly comprises a base in the form of a generally channel shaped supporting pan 10. A plurality of stationary plug-in type blade contacts 11, 12, 13, 14 and 15 are supported from bus bars 16, 17 and 18. The bus bars 16, 17 and 18 are in turn suitably supported by adequate insulating means 19, 20 and 21, as may best be seen in the cross-sectional view of FIGURE 2. A plurality of circuit breakers 22, 23, 24, 25, 26, 27 and 28 of two modular sizes and generally rectangular shape are shown in engagement with the panel board load center. It will be noted that circuit breakers 22, 23, 24 and 25 are of the smaller modular size and as can be seen in FIGURE 1, such four modular size circuit breakers can be mounted in engagement with one contact member of the plug-in type conceived by the present invention. The smaller modular size circuit breakers 26 and 27 are shown mounted on only one side of a contact member 11, thus leaving two transverse blade members 11a and 11b remaining available for use with two additional smaller size modular circuit breakers or one-half of the central blade member 11c which may be used for engagement with a circuit breaker of the larger modular size.

Circuit breaker 28 of the larger modular size is shown engaged in side-by-side relationship to circuit breaker 27 of the smaller modular size and as may be clearly seen from FIGURE 1, the larger circuit breaker 28 is substantially twice the width of the smaller size modular circuit breakers. Typically such modular sizes may be related through a module of one-half inch width, with a one-half inch modular width for the smaller circuit breaker and a one-inch width for circuit breakers of the larger modular size. As can readily be seen from FIGURE 1, all the circuit breakers, regardless of size comprise a generally rectangular insulating casing of substantially the same height and length, differing principally in dimension of width from one modular size to another. As may be appreciated from the illustration of the assembly shown in FIGURE 1, it is impossible for a circuit breaker of the larger modular size to be inadvertently or deliberately connected across two contact members such as the adjacent contact members 11 and 12.

In accordance with the concept of the present invention, the opposed contact jaws which comprise the plug-in contact means within the circuit breaker, are oriented and disposed in one direction in the larger circuit breaker, i.e., substantially in alignment with the length axis of the circuit breaker casing; and the comparable opposed contact jaws which comprise the contact means within the smaller size modular circuit breakers are aligned in a direction 90° away from the orientation of the contact jaws of the larger modular size circuit breaker, i.e., the contact jaws of smaller circuit breakers are aligned generally along the width axis of the smaller modular size circuit breakers. Additionally in accordance with the concept of the present invention, it is possible to provide segregating means in any desired portion of the load center of the panel board by eliminating any desired number of transverse blades as is typically illustrated by the contact member 14 which has three transverse blades rather than four and the contact means 15 which has two transverse blades offset from each other. As will be explained more fully hereinafter, by eliminating all transverse blades from the contact means of the plug-in type load center of the present invention, it is only possible to connect the larger modular size circuit breaker in engagement with that contact means, since the smaller size circuit breakers are engageable only with a transversely oriented blade. For instance, it is possible to connect two smaller modular size circuit breakers to the transverse blade members 14a and 14b on the left-hand side of contact member 14, but only one larger modular size circuit breaker may be connected to the transverse blade 14d on the right hand side of contact member 14. In yet another arrangement, the contact means 15 has two transverse blades and therefore it is only possible in accordance with the concept of the present invention to connect one larger modular size circuit breaker in engagement on each side of the central blade 15c, or one smaller size circuit breaker on each side of the contact member to the transverse, offset blades 15a and 15b.

Typically the bus bars 16, 17 and 18 may be connected to a source of electrical energy in the form of alternating current of the three phase type, a different phase being connected to each of the bus bars 16, 17 and 18. As will be appreciated by those skilled in the art, it is therefore one of the advantages and features of the present invention that it is impossible for a larger size circuit breaker, such as that illustrated for instance at 28 to be inadvertently connected across two contact members such as 12 and 13 for instance, short circuiting two phases of an electrical source. It will also be readily apparent that the panel board contact members may be connected to different phases of electrical energy supplied to the bus bars 16, 17 and 18 and the respective contact means configured so as to permit only a desired size of modular circuit breaker to be connected into a particular phase of an electrical source.

In accordance with another aspect of the present invention, a two pole circuit breaker assembly may be connected to two adjacent transverse blade members of adjacent electrical contacts of a panel board arranged to be connectable to at least two different sources of electrical energy. As shown in FIGURE 1, two circuit breakers of smaller modular size 63 and 64 are joined in a common assembly to function as a two-pole circuit breaker. The electrical contact 11 is in electrical connection with bus bar 18. Thus the two adjacent electrical contacts 11 and 12 will carry two phases of electrical energy when bus bars 17 and 18 are connected to two different phases of an electrical source. Accordingly, two circuit breakers such as shown at 63 and 64, when joined together by an appropriate means such as a rivet through their insulating casings, become in effect a two pole circuit breaker by reason of connection to two different sources of electrical energy such as are available at transverse blade members 11b and 12a. Additionally, it will be noted that the handles extending through the insulating casings of circuit breakers 63 and 64 comprising the two pole circuit breaker assembly are joined by the common handle tie 65.

In accordance with the present invention, a panel board load center and circuit breakers adapted to be engageable therewith may also be arranged in three pole circuit breaker assemblies to service needs for electrical supply to three phase electrical equipment. In such an arrangement, the bus bars 16, 17 and 18 of FIGURE 1 would each be connected to a different phase of an electrical source. Accordingly, adjacent electrical contacts such as those shown at 11, 12 and 13 would be supplied with three different phases of electrical energy, and an assembly of modular circuit breakers arranged as will be explained more fully hereinafter may be engaged in electrical contact as a three pole circuit breaker unit.

Figure 2:
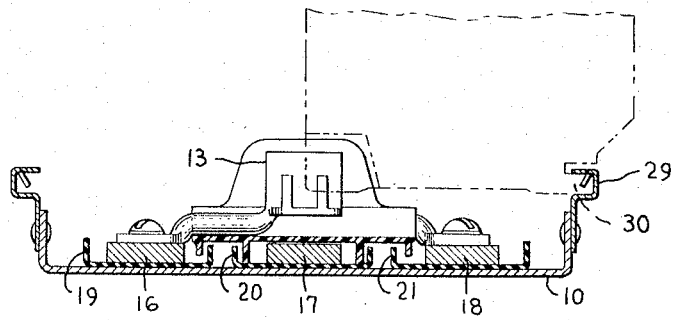
FIGURE 2 is a cross-sectional view of the panel board of FIGURE 1 taken through section 2—2.

Typically the preferred embodiment of the panel board load center of the present invention as shown in the cross-section view of FIGURE 2, may include a flange member, as shown generally at 29, attached to the base 10 and including a retaining means configured and adapted to receive a lug 30 formed on the bottom wall of the insulating casing of the circuit breakers to be engaged in contact with the load center. To insert a circuit breaker, lug 30 is engaged within the retaining means 29 and rotated about this point until the opposed contact jaws of the circuit breaker engage the contact member of the load center, the larger modular size circuit breaker engaging the central blade of a contact member and the smaller size modular circuit breaker engaging one of the transverse blades of a contact member.

FIGURE 3 is a perspective view of a typical contact member configured and proportioned in accordance with the concept of the present invention. The one end of contact member 31 has an aperture therein 32 adapted to receive means to secure the contact member 31 to a bus bar, for instance; an arm 33, extends outwardly and supports at its free or other end, a blade assembly having a contact cross section generally of H-shaped configuration and comprising the central blade 34 and a plurality of transverse blades or planar wing portions extending at right angles therefrom, as indicated by 35 and 36, for instance. A base portion extends about and between the central blade 34 and transverse blades or wing portions 35 and 36 at the base thereof with the transverse platen thereof extending in spaced relationship to the base or supporting pan 10. Thus, the transverse blade or wing portions as well as the central blade extend upwardly from the base portion and generally normally thereto.

FIGURE 4 shows in enlarged form the top elevational view of the blade construction of the contact member 31. As may be seen more clearly from FIGURE 4, the central blade member 34 has extending therefrom at right angular relationship and in spaced relation to each other, a number of transverse blades such as the blades 35, 36 on the one side of the central blade 34 and the comparable blades 37 and 38 on the opposite side of the central blade 34. In the preferred embodiment of the present invention, it should also be noted that each of the transverse blades 35, 36, 37 and 38 have a lip which extends the length of one outer edge as shown at 35a, 36a, 37a and 38a. As will be explained more fully hereinafter, the particular configuration of blade members, including the lip on the outer edge of the transverse blades, affords one of the more desirable features of the present invention.

FIGURE 5 is a perspective phantom outline of the insulating casing 39 of the larger modular size circuit breaker, including opposed contact jaws as conceived by the present invention shown generally at 40. As can be seen from FIGURES 5 and 7, the opposed contact jaws 41 and 42 of the contact means 40 included in the circuit breaker insulating casing 39 of FIGURE 5, are aligned with the major axis of the bottom wall of the insulating casing of the circuit breaker 39 and are adapted to be engaged with the central blade such as that shown at 34 of the blade contact member of FIGURE 4 or FIGURE 3. The insulating casing is of course appropriately recessed to accommodate the blades of contact member 31 and to afford the engagement of the opposed jaws 41 and 42 in secure electrical contact with the central blade member 34.

Figure 9:
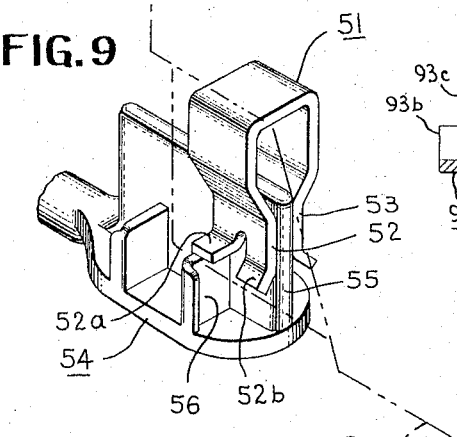
FIGURE 9 is a partially phantom, perspective view illustrating the manner of engagement of the larger modular size circuit breaker with the panel board contact means.

FIGURE 6 illustrates in phantom perspective, the smaller modular size of circuit breaker 44 including contact means 45 comprised of opposed resilient jaws 47 and 46 which, however, it will be noted are not in alignment with the major axis of the bottom wall of the insulating casing of the circuit breaker 44 but rather at right angles to that axis. As will be apparent from reference to FIGURE 8 and FIGURE 6, the circuit breaker 44 of the smaller modular size may only be engaged with one of the transverse blades 35, 36, 37 or 38 of FIGURE 3 in the manner shown in FIGURE 8. As illustrated in FIGURE 8, one of the jaw members 47, of FIGURE 6 is slotted so as to receive the lip 38a which runs along the edge of the transverse blade 38. Accordingly, the circuit breakers of the smaller modular size are held firmly against transverse movement by the mechanical engagement of the slot in one of its resilient opposed jaws with the lip portion of the transverse blade with which it is engaged in electrical and mechanical contact. Thus the proper positioning of the smaller modular size circuit breakers is assured by this arrangement as will be apparent to those skilled in the art. Similarly, side-wise movement of larger modular size circuit breakers is prevented because of the alignment and the orientation of its resilient opposed jaw members and engagement with the central blade member which prevents its sidewise movement. It should be noted, however, that the resilient opposed contact jaw members of the larger size modular circuit breaker are split into two portions as shown in FIGURE 5 and one portion is bent downwardly so as to bear against and engage with the transverse blades of the contact member of the present invention and thus prevent the movement of the larger modular size circuit breaker along the axis of the central blade, such as 34 shown in FIGURE 4. This particular configuration of the opposed resilient contact means of the larger sized modular circuit breaker is best shown in the partially phantom perspective view of FIGURE 9. A circuit breaker of the larger modular size having a contact means generally disposed and indicated at 51, is engaged with a load center contact means 54, having a central blade member 55 engaged in electrical contact with the opposed contact jaws 52 and 53 and split into two sections as may be seen most clearly at 52a and 52b. The portion 52a is bent outwardly and perpendicularly from the upper portion of the resilient opposed jaws and is so configured as to rest upon the transverse blade 56 of the contact means 54. The other portion 52b of the split contact jaw member 52, is bent downwardly and outwardly so as to form a means for guiding the contact member 51 into proper engagement with the central blade member 55 and also bearing upon the transverse blade 56 of the contact member 54 to prevent movement of the circuit breaker 50 along the axis of the central blade member 55.

Figure 10:
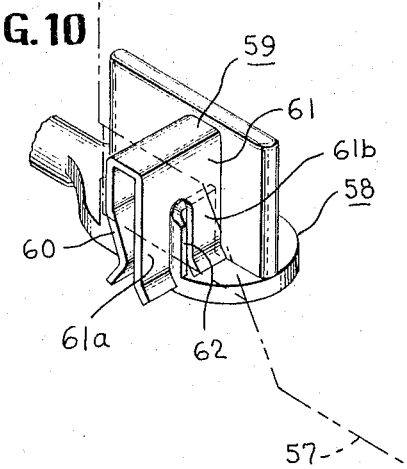
FIGURE 10 is a partially phantom, perspective view illustrating the manner of engagement of the smaller modular circuit breaker with the panel board contact means.

FIGURE 10 illustrates in phantom outline the casing of a circuit breaker 57 of the smaller modular size in engagement with a contact member shown generally at 58. The transversely disposed contact jaws shown generally at 59 comprise two opposed members 60 and 61. It will be noted that the latter contact jaw is slotted and divided into two portions 61a and 61b. Upon engagement of the circuit breaker 57 with the contact means 58, a transverse blade member 62 is slidingly received in the slot between the two portions 61a and 61b of one of the opposed jaws 61 of the circuit breaker contact means 59. Thus, seated in such engagement, the circuit breakers of the smaller modular size as conceived by the present invention are effectively secured against sidewise movement because of the engagement of the lip of the transverse blade within the slot of the split contact jaw.

It should be noted in FIGURES 5 and 6 that each of the insulating casings of the circuit breaker is provided with like lug means 43 and 48, respectively, which are adapted and dimensioned to engage the retaining means 29 as shown in the cross-sectional view of FIGURE 2, illustrating the configuration of the base member of the panel board load center of the present invention. As previously described, in order to engage a circuit breaker of the present invention in the load center, the lug such as shown at 43 or 48 in FIGURES 5 and 6, respectively, is inserted into the retaining means 29 of the flange 30 of FIGURE 2 and rotated about that point until the resilient opposed contact jaws come into engagement with the appropriate blade in accordance with the size of the circuit breaker being engaged in the load center. The larger size circuit breaker, as previously explained, becomes engaged with the central blade of the contact means of the load center, whereas the smaller modular size circuit breaker engages one of the smaller transverse blades of the contact means of the load center.

Figure 11:
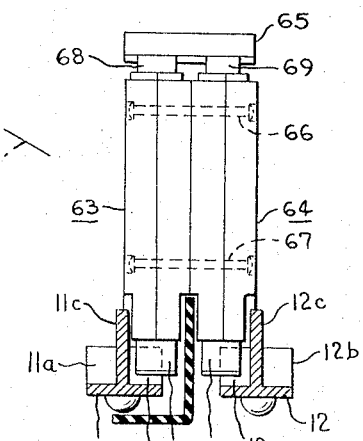
FIGURE 11 is a partially cross-sectional end view of a two-pole circuit breaker assembly comprising two units of smaller modular size shown in engagement with two adjacent transverse contact members of a panel board.

FIGURE 11 is an illustration of two smaller modular size circuit breakers 63 and 64 combined in a common circuit breaker assembly to provide a two pole circuit breaker unit. As shown, circuit breakers 63 and 64 are enclosed within insulating casings having side walls of substantially the same dimensions and the two circuit breakers are joined by appropriate means such as the rivets 66 and 67 which pass through their insulating casings affixing the two circuit breakers 63 and 64 to each other. Additionally, the two circuit breakers 63 and 64 are joined externally by a common handle tie 65 which is affixed to and joins their respective externally handle members 68 and 69. FIGURE 11 may be considered as a partially cross-sectional view of a portion of a panel board load center such as is shown in FIGURE 1 and more particularly that portion of the panel board of FIGURE 1 which includes the electrical contacts 11 and 12. Thus, the electrical contacts 11 comprising a central major blade member 11c and two transverse blade members 11a and 11b is shown disposed in an adjacent portion to electrical contact 12 which is similarly comprised of a major central blade member 12c and two transverse blade members 12a and 12b. The circuit breakers 63 and 64 are provided with appropriate contact means such as the resilient contact jaws shown at 70 and 71, respectively. In accordance with the concept of the present invention, the central major blade members of the electrical contacts are disposed on a panel board load center arrangement so as to be spaced substantially one full module width apart. Thus the transverse blades electrically connected with and supported by such major central blades are disposed intermediate the one full module width spacing between the adjacent major central blades and therefore are engageable by circuit breaker contact means within the one full module width spacing. Accordingly, a two pole modular circuit breaker assembly having a one full module width such as illustrated in FIGURE 11 is engageable with two adjacent transverse blade members such as 11b and 12a which are electrically connected to different phases of an electrical source.

Figure 12:
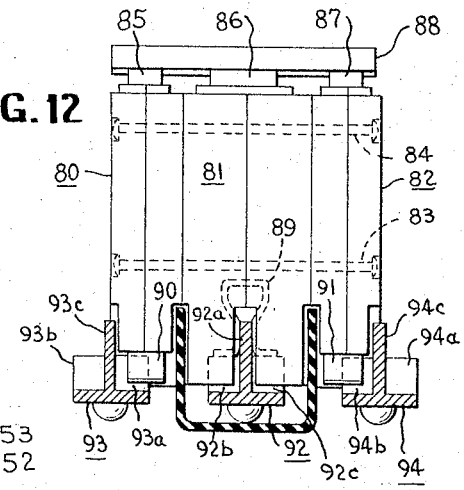
FIGURE 12 is a three-pole circuit breaker assembly comprising one unit of the larger modular size and two units of the smaller modular size shown in engagement with a central blade member and two adjacent transverse contact members of a panel board.

Additionally, the concept of the present invention contemplates the use of an assembly of three modular circuit breaker units into a multipole circuit breaker assembly of two full module widths which may be employed in a three phase circuit breaker requirement. FIGURE 12 shows three modular size circuit breakers 80, 81 and 82 having insulating casings with side walls of substantially the same dimension and joined into a single assembly by appropriate means such as the rivets 83 and 84 which pass through the three insulating casings and join them together. Externally the extending handle members 85, 86 and 87 of the circuit breakers 80, 81 and 82, respectively, are joined by a common handle tie 88. It will be noted that in FIGURE 12 the circuit breaker 81 is of a larger modular size substantially twice the width of circuit breakers 80 and 82 which are arranged on either side of circuit breaker 81. Accordingly, the contact means 89 of the larger modular size circuit breaker 81 engages the central major blade member 92a of the middle electrical contact 92 of the illustration of FIGURE 12. The circuit breaker 80 disposed to one side of the circuit breaker 81 is of the smaller modular size however, and engages the transverse blade 93a of the adjacent electrical contact 93. Similarly the smaller modular size circuit breaker 82 disposed on the other side of the larger modular size circuit breaker 81, engages a transverse blade member 94b of the electrical contact 94 disposed and spaced adjacent to the middle electrical contact 92. Thus when electrical contacts 92, 93 and 94 are supplied from different phases of an electrical source through bus bars arranged substantially as illustrated in FIGURE 1, the circuit breaker assembly of FIGURE 12 is in effect a three pole modular circuit breaker unit and may be connected as such into engagement with a panel board load center of the present invention in accordance with its teaching within a two full module space.

It will be apparent to those skilled in the art that the present invention offers the advantages and desirable features of a firm electrical contact and engagement, mechanical stability in a fixed and predetermined position, and the segregation of different modular sizes of circuit breakers as predetermined and as may be desired. Additionally, circuit breakers employed in a load center panel board installation as conceived by the present invention may not be inadvertently engaged across two different phases of electrical energy such as may be connected to adjacent panel board contact members; nor may a smaller modular size circuit breaker be connected into engagement at a point on the load center in which it is desired to have only the larger modular size. Such segregation is achieved by selectively eliminating one or more of the transverse blades which are the only means afforded for engagement of the smaller size modular circuit breaker.

If desired, in accordance with the invention, the central blade portion of one or more contact members may be omitted, leaving only the transverse portions and the base portion, so that only the smaller size modular circuit breakers may be mounted at such locations. Thus the portion 34 of the contact member 31 of FIGURE 4 may be omitted, leaving only the transverse portions 35, 36, 37 and 38 and the base portion thereabout and therebetween.

Those knowledgeable in the art will appreciate that the term "circuit breaker" as used in the foregoing description and the appended claims is intended to refer to any device which is capable of making and/or breaking an electric circuit including devices which are manually operable and also those which have fusible means.

While the invention has been illustrated in only one embodiment, it will be readily apparent that many modifications thereof may be made, and we therefore intend by the appended claims to cover all such modifications as fall within the true spirit and scope of the invention.

What we claim as new and desire to secure by Letters Patent of the United States is:

1. An electric circuit control device panel board comprising a generally planar base, insulating means mounted on said base, a plurality of electrical contacts supported on said insulating means, at least some of said electrical contacts including a central blade member extending generally normal to the plane of said base, and at least one transverse blade extending perpendicularly from said central blade on each side thereof, and a plurality of circuit breakers of first and second modular size, said circuit breakers of said first modular size including electrical contact means configured and disposed to engage a central blade and said circuit breakers of said second modular size including electrical contact means configured and disposed to engage one of said transverse blades.

2. An electric circuit control device panel board comprising a generally planar base, insulating means mounted on said base, a plurality of electrical contacts supported on said insulating means, at least some of said electrical contacts including a central blade member extending generally normal to the plane of said base and in spaced parallel relationship to each other and two transverse blades extending perpendicularly from each said central blade on each side thereof and in spaced relation to each other, and a plurality of circuit breakers of first and second modular size, said circuit breakers of said first modular size including electrical contact means configured and disposed to engage a central blade and said circuit breakers of said second modular size including electrical contact means configured and disposed to engage one of said transverse blades.

3. An electric circuit control device panel board comprising a generally planar base, insulating means mounted on said base, a plurality of electrical contacts supported on said insulating means, at least some of said electrical contacts including a central blade member extending generally normal to the plane of said base and in spaced parallel relationship to each other and two transverse blades extending perpendicularly from each said central blade on each side thereof and in spaced relation to each other, and a plurality of circuit breakers of first and second modular size, said circuit breakers of said first modular size including electrical contact means configured and disposed to engage not more than one-half of a central blade between said spaced transverse blades and said circuit breakers of said second modular size including electrical contact means adapted and positioned to engage one of said transverse blades.

4. An electric circuit control device panel board comprising a generally planar base having a flange portion extending therefrom, retaining means affixed to said flange portion and having an open end facing inwardly to said base, insulating means mounted on said base, a plurality of electrical contacts supported on said insulating means, at least some of said electrical contacts including a central blade member extending generally normal to the plane of said base and in spaced parallel relationship to each other, and two transverse blades extending perpendicularly from each said central blade on each side thereof in spaced relation to each other, and a plurality of circuit breakers of first and second modular size, each comprising a generally rectangular insulating casing having a bottom wall and generally perpendicular end walls and a retaining lug adjacent one corner of said bottom wall adapted to engage said retaining means, said circuit breakers of said first modular size including electrical contact means positioned adjacent the other corner of said bottom wall and configured to engage a central blade and said circuit breakers of said second modular size including electrical contact means positioned adjacent the other corner of said bottom wall and configured to engage one of said transverse blades.

5. An electric circuit control device panel board comprising a generally planar base, insulating means mounted on said base, a plurality of electrical contacts supported on said insulating means, at least some of said contacts including a central blade member extending generally normal to the plane of said base and in spaced parallel relationship to each other and two transverse blades extending perpendicularly from the lower portion of each said central blade on each side thereof and in spaced relation to each other, and a plurality of circuit breakers of first and second modular size, said circuit breakers of said first modular size including electrical contact means configured and disposed to engage a central blade between said spaced transverse blades and said circuit breakers of said second modular size including electrical contact means configured and disposed to engage one of said transverse blades.

6. An electric circuit control device panel board comprising a generally planar base having a flange portion extending therefrom, retaining means affixed in said flange portion and having an open end facing inwardly to said base, insulating means mounted on said base, a plurality of electrical contacts supported on said insulating means, at least some of said electrical contacts including a central blade member extending generally normal to the plane of said base and in spaced parallel relationship to each other and two transverse blades extending perpendicularly from the lower portion of each said central blade on each side thereof in spaced relation to each other, said transverse blades each having a lip co-extensive with its outer edge, and a plurality of circuit breakers of first and second modular size each comprising a generally rectangular casing having a bottom wall and two end walls and a retaining lug adjacent one corner of said bottom wall adapted to engage said retaining means, said circuit breakers of said first modular size including electrical contact means positioned adjacent the other corner of said bottom wall and configured to engage a central blade and said circuit breakers of said second modular size including electrical contact means positioned adjacent the other corner of said bottom wall and configured to engage one of said transverse blades between its lip and juncture with said central blade.

7. An electric circuit control device panel board as claimed in claim 6 wherein said circuit breakers of said first modular size includes electrical contact means of opposed resilient jaws, and said jaws are split into two portions, one of said portions having a lower section in the form of right angular flanges disposed to abut the top of two aligned transverse blades of said panel board contact means upon engagement therewith and the other of said portions having a lower section disposed angularly to abut the sides of said transverse blades.

8. An electric circuit control device panel board as claimed in claim 6 wherein said circuit breakers of said second modular size include electrical contact means of opposed resilient jaws and one of said jaws is slotted to slidingly receive and engage a lip portion co-extensive with an outer edge of one of said transverse contact blades upon engagement therewith.

9. In a control device panel board, the combination comprising:
(a) a support;
(b) an elongated busbar supported in insulated relationship on said support; and
(c) an electrical contact unit having a contact arm portion electrically connected adjacent one end thereof to said busbar and extending generally normally thereto, said contact arm portion having a base portion adjacent its other end with a transverse plane extending in spaced relationship to said support and generally parallel thereto, said contact arm base portion also have at least one generally planar wing portion projecting upwardly from said contact arm base portion, said wing portion extending normally to said transverse plane and generally parallel to said busbar, the opposite surfaces of said wing portion providing a pair of contact surfaces extending generally parallel to said busbar and generally normally to said transverse plane, said wing portion being adapted to receive a contact socket extending transversely of an associated circuit breaker to provide electrical contact therefor to said busbar.

10. In a control device panel board, the combination comprising:
 (a) a support;
 (b) two generally parallel elongated busbars supported in insulated relationship on said support; and
 (c) an electrical contact unit having a contact arm portion electrically connected adjacent one end thereof to one of said busbars and extending generally normally thereto, said contact arm portion having a base portion adjacent its other end with a transverse plane extending in spaced relationship to said support and generally parallel thereto said contact unit having a blade portion extending upwardly from said base portion intermediate the width thereof and extending generally normally to said busbars and said base portion, said contact arm base portion also having a generally planar wing portion projecting upwardly from said contact arm base portion on each side of said blade portion adjacent said other end thereof, said wing portions extending normally to said transverse plane and generally parallel to said busbars, the opposite surfaces of said wing portions providing a pair of contact surfaces extending generally parallel to said busbars and generally normally to said transverse plane and blade portion, said blade portion being adapted to receive a contact socket extending longitudinally of an associated circuit breaker disposed over said one busbar, said wing portions being adapted to receive the contact sockets extending transversely of an associated circuit breaker disposed over the other of said busbars to provide electrical contact therefore to said one busbar.

References Cited by the Examiner
UNITED STATES PATENTS
2,790,113   4/1957   Brown _____ 317—119

ROBERT K. SCHAEFER, *Primary Examiner.*

W. C. GARVERT, *Assistant Examiner.*